United States Patent [19]

Schwartz et al.

[11] Patent Number: 5,371,791
[45] Date of Patent: Dec. 6, 1994

[54] HOUSING ASSEMBLY FASTENER FOR FASTENING HOUSING ASSEMBLY PORTIONS AND A SUBSTRATE

[75] Inventors: Mark W. Schwartz, Addison; Scott R. Semenik, Lake Zurich; Jeffery F. Kurgan, Hoffman Estates, all of Ill.

[73] Assignee: Motorola, Inc., Schaumburg, Ill.

[21] Appl. No.: 159,061

[22] Filed: Nov. 29, 1993

Related U.S. Application Data

[63] Continuation of Ser. No. 838,013, Feb. 21, 1992, abandoned, which is a continuation-in-part of Ser. No. 799,818, Nov. 29, 1991, abandoned.

[51] Int. Cl.$^5$ .............................................. H04M 1/00
[52] U.S. Cl. ............................ 379/433; 379/434; 379/428
[58] Field of Search ............... 379/433, 428, 429, 368, 379/369, 370, 435, 436, 58; 403/326, 373, 375; 439/76, 701, 731, 686, 687, 689, 690, 695, 696

[56] References Cited

U.S. PATENT DOCUMENTS 5,157,724  10/1992  Schmidt et al. ............... 379/369
5,207,586   5/1993  MacGregor et al. ........... 439/76

FOREIGN PATENT DOCUMENTS 126354    7/1984   Japan ................... 379/433
222552    9/1988   Japan ................... 379/428
302650   12/1988   Japan ................... 379/433
2199213   6/1988   United Kingdom ........ 379/433

*Primary Examiner*—James L. Dwyer
*Assistant Examiner*—Jack Chiang
*Attorney, Agent, or Firm*—Rolland R. Hackbart

[57] ABSTRACT

A fastener for fastening at least two tandemly-positioned surfaces, such as opposing surfaces of a housing assembly, theretogether. The fastener includes first and second hook members which are affixed in a defined relationship with top and bottom surfaces which are to be affixed theretogether. A clip formed of a multi-slotted plate member having slotted openings of dimensions corresponding to the dimensions of the hook members is fastened about the hook members to affix the hook members, and hence, the top and bottom surfaces theretogether. By affixing the clip to a substrate positioned between the top and bottom surfaces, the single clip may be utilized to fasten the substrate in position between the top and bottom surfaces.

18 Claims, 8 Drawing Sheets

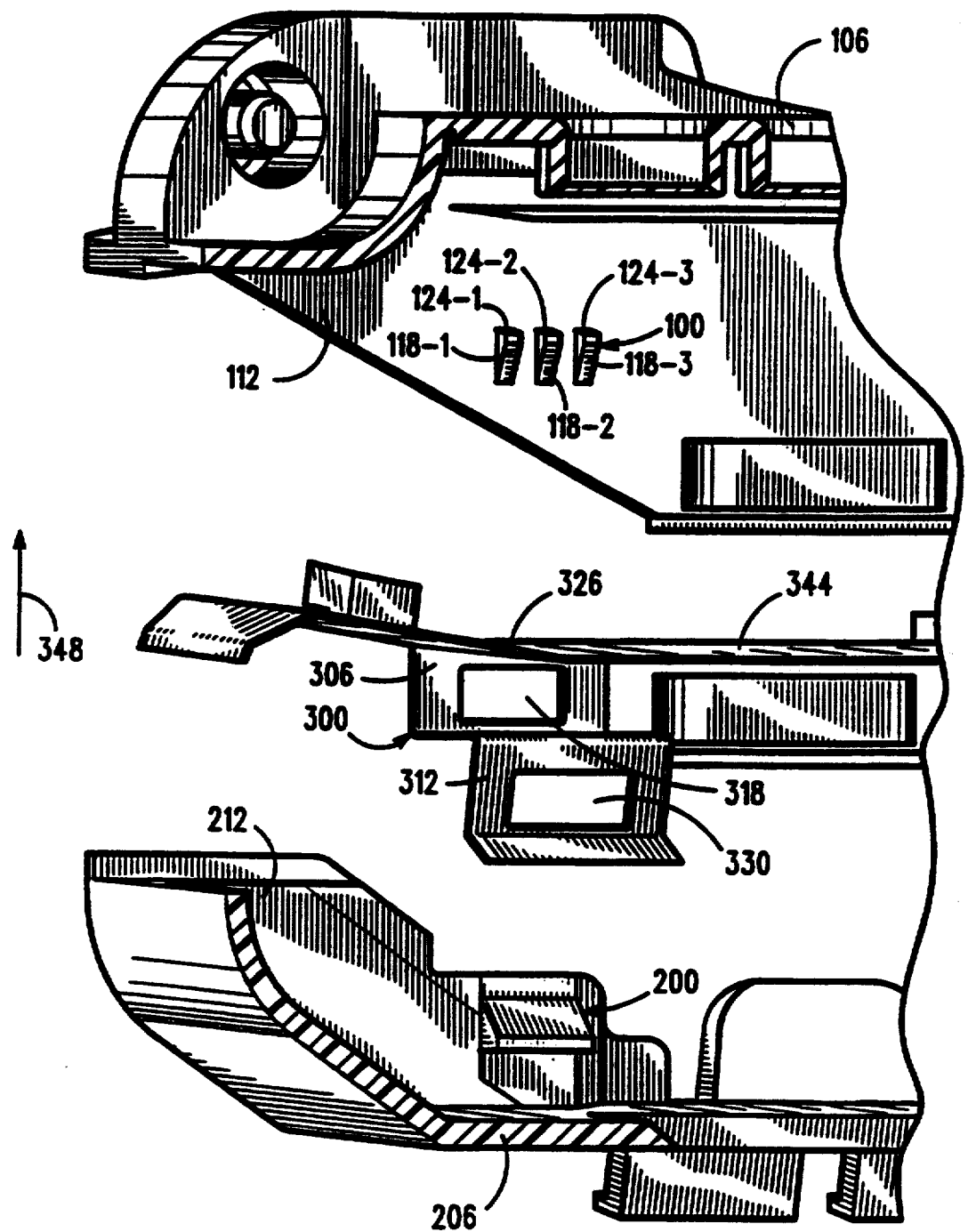
FIG. 4-I

HOUSING ASSEMBLY FASTENER FOR FASTENING HOUSING ASSEMBLY PORTIONS AND A SUBSTRATE

CROSS-REFERENCE TO RELATED APPLICATIONS

This is a continuation of application Ser. No. 07/838,013, filed Feb. 21, 1992 and now abandoned, which is a continuation-in-part of application Ser. No. 07/799,818, filed on Nov. 29, 1991, now is abandoned, entitled "Apparatus For Accepting And Retaining A Smart Card" by Jeffery F. Kurgan.

BACKGROUND OF THE INVENTION

The present invention relates generally to fasteners, and, more particularly, to a fastener which fastens two or more tandemly-positioned surfaces theretogether, such as, without way of limitation, opposing surfaces of a housing assembly for an electronic device.

Advancements in the field of radio electronics have permitted the introduction and commercialization of an ever-increasing array of radio communication apparatus. Advancements in electronic circuitry design have also permitted increased miniaturization of the electronic circuitry comprising such radio communication apparatus. As a result, an ever-increasing array of radio communication apparatus comprised of ever-smaller electronic circuitry has permitted such radio communication apparatus to be utilized more conveniently in an increased number of applications.

A radio transceiver, such as a radiotelephone utilized in a cellular, communication system, is one example of radio communication apparatus which has been miniaturized to be utilized conveniently in an increased number of applications. Additional efforts to miniaturize further the electronic circuitry of similar such radio transceivers, as well as other radio communication apparatus, are being made. Such further miniaturization of the radio transceivers will further increase the convenience of utilization of such apparatus, and will permit such apparatus to be utilized in further increased numbers of applications.

Pursuant to such efforts to miniaturize further the electronic circuitry of such radio transceivers (as well as other radio communication apparatus), size minimization of the electronic circuitry is a critical design goal during design of such circuitry.

Concomitant with the increased miniaturization of electronic circuitry is a corresponding reduction in the physical dimensions of the housings in which such electronic circuitry is housed as well as other mechanical structure associated therewith.

Initially, size reductions in the housing and associated mechanical structure was accomplished by simple, scale reduction of the dimensions of already-existing structures. However, beyond certain size reductions, such simple, scale reduction increasingly becomes impractical. Beyond a certain point, structural limitations of the materials comprising such structure cannot be reduced further without comprising the structural integrity thereof.

For instance, the housings of many such electronic devices are comprised of a thermoplastic material. The walls of such housings must be greater than minimal thicknesses to ensure the structural integrity of such walls, and the housings formed therefrom. Other housings and associated mechanical structures comprised of other materials suffer from similar, size-reduction limitations.

Many conventional, housing constructions are comprised of a front housing portion and a rear housing portion. Typically, the electronic circuitry comprising the electronic device is disposed upon a circuit board (or several circuit boards) and the circuit board is mounted or otherwise affixed to the rear housing portion of the conventional, housing construction. Once affixed in position, the front housing portion is then placed over the circuit board and a fastening mechanism fastens the front and rear housing portions theretogether, thereby to enclose in supportive containment the circuit board within the housing construction.

The fastening mechanism by which the front and rear housing portions of the housing construction are fastened theretogether may be comprised of any of many various designs. Most simply, threaded shaft members may be utilized to affix the housing portions theretogether. Also, and particularly when the housing construction is formed of a thermoplastic material, the fastening mechanism may be formed integral with the abutting edge surfaces of the sidewalls of the respective housing portions.

However, due to the aforementioned size reduction in the housings of many electronic devices, existing fastening mechanisms for fastening portions of such housings theretogether cannot be utilized when the dimensions of housings are reduced beyond a certain level.

Also, additional innovations, both electronic and mechanical in nature, are increasingly being incorporated into the constructions of such electronic devices. Such additional innovations provide such electronic devices with additional features to increase the convenience of use of the devices. Incorporation of such innovations into such electronic devices makes even more challenging the ongoing design goal of reducing the dimensions of the housings and other mechanical structure of the electronic devices. Design of fastening mechanisms which fasten opposing portions of a housing construction theretogether is accordingly also made more challenging as increased amounts of structure is to be housed in increasingly-miniaturized housings.

With particular reference to a radio transceiver comprising a cellular radiotelephone, disclosed in the aforementioned, copending patent application is structure, referred to as a card reader assembly. Such structure is housed within the housing of the radiotelephone, and is operative to receive a card, substantially similar in dimensions to a conventional, credit card. The card contains information which, once received by the card reader assembly, may be utilized by the radiotelephone for any of various purposes. For instance, the information contained on such card could include an identification number to be utilized for billing purposes to bill a phone call made through the radiotelephone to a particular billing address. Because the card having the identification number can be removed from one radiotelephone, and placed in another, calls made from more than one radiotelephone may be billed to a single billing address.

Such a card reader assembly incorporated to form a portion of a radiotelephone must be mounted within the housing assembly of the radiotelephone in a precise orientation. Also, the housing assembly must be adapted to permit the card reader assembly to receive the card to obtain the desired information therefrom. That is to say, the card reader assembly must be accessible from the exterior of the housing assembly. To position precisely the card reader assembly within the housing assembly, the card reader assembly must be fastened to the housing assembly to affix the card reader assembly in position thereby, and in the desired orientation so that the card reader may be accessed from the exterior of the housing assembly.

The housing assembly, comprised of a front portion and a rear portion, as noted above, must be fastened theretogether by the fastening mechanisms at locations along the abutting surfaces which form the interface between the two housing portions to ensure structural integrity of the housing assembly. Such fastening mechanisms which fasten the front and rear housing portions theretogether must therefore be positioned at spaced intervals along the interface between the two housing portions.

With the continual reduction in the physical dimensions of the housing and other mechanical structure of the radiotelephone, care must be exercised during design of the radiotelephone to ensure that both the fastening mechanisms which fasten the card reader assembly (or any other substrate) positioned within the housing assembly to such housing assembly, and the fastening mechanisms which fasten the front and rear housing portions of the housing assembly theretogether may both be appropriately positioned in a non-interfering relationship.

As the physical dimensions of the housing assembly are reduced, radiotelephone design in which such fastening mechanism may be positioned in a non-interfering arrangement becomes increasingly difficult. As the thicknesses of the housing surfaces and sidewalls are reduced to minimal thicknesses, as mentioned previously, conventional fasteners cannot be used as channels previously formed in the housing structure to receive such fasteners of adequate depths can no longer be made. Therefore, the constraints of the type of fastening mechanism which may be utilized to fasten the card reader assembly (or, again, any other substrate) in position within a housing assembly are the same as the previously-mentioned constraints placed on the fastening mechanisms which fasten front and rear housing portions of the housing assembly theretogether.

What is needed, therefore, is a fastener of minimal dimensions which fastens two surfaces theretogether.

What is additionally needed is a fastener which, not only fastens the two surfaces theretogether, but which additionally fastens a substrate between such two surfaces.

SUMMARY OF THE INVENTION

The present invention, accordingly, advantageously provides a fastener of minimal dimensions for fastening two tandemly-positioned surfaces theretogether.

The present invention further advantageously provides a fastener for fastening a substrate between two tandemly-positioned surfaces.

The present invention yet further advantageously provides a fastener which fastens two tandemly-positioned surfaces, and a substrate positioned therebetween, theretogether. The present invention provides further advantages and features, the details of which will become more evident by reading the detailed description of the preferred embodiment hereinbelow.

In accordance with the present invention, therefore, a fastener for fastening a first surface and a tandemly-positioned second surface theretogether is disclosed. The fastener comprises a first hook member positioned beneath the first surface in a fixed relation therewith and a second hook member positioned above the second surface in a fixed relation therewith. A dip capable of clasping engagement with both the first hook member and the second hook member is positioned about both the first hook member and the second hook member to fasten thereby the first surface and the tandemly-positioned second surface theretogether.

BRIEF DESCRIPTION OF THE DRAWINGS

The present invention will be better understood when read in light of the accompanying drawings in which:

FIG. 4-I is a cut away, isometric view, similar with that of FIG. 4, but of an alternate, preferred embodiment of the present invention;

DESCRIPTION OF THE PREFERRED EMBODIMENTS

Figure 1:
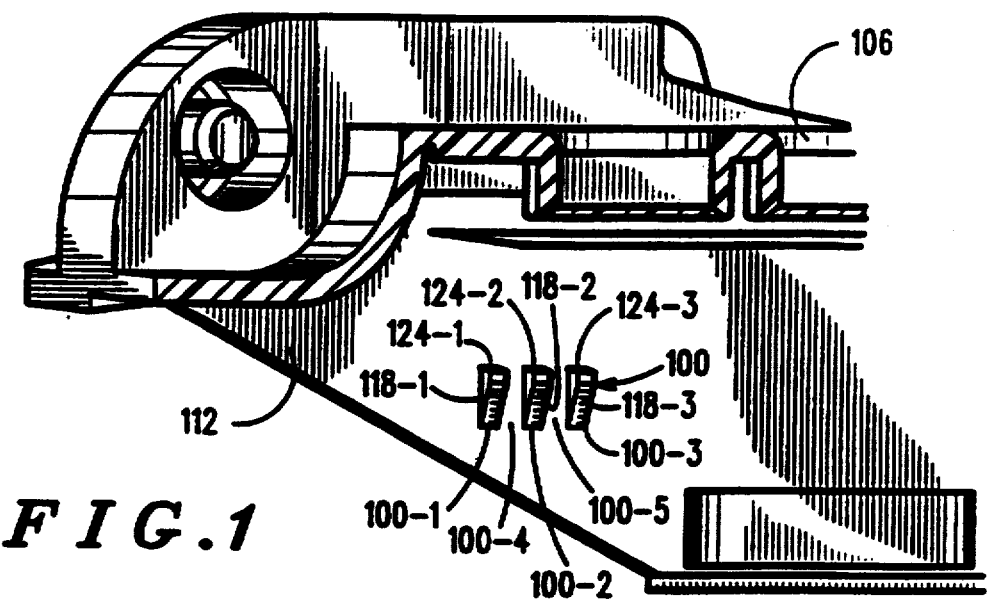
FIG. 1 is a cut away, isometric view of a hook member forming a portion of the fastener of the preferred embodiment of the present invention.

Referring first to the cut away, isometric view of FIG. 1, a hook member, referred to generally by reference numeral 100, which forms a portion of the fastener of the preferred embodiment of the present invention, is shown.

Hook member 100 is formed at a predetermined distance beneath surface 106, here a top, face surface of a top housing portion of a housing assembly. As illustrated, hook member 100 is formed upon an inner wall of a flange forming sidewall 112 of the front housing assembly portion.

Hook member 100, in the preferred embodiment, is comprised of a resilient material and is formed of hook member portions 100-1, 100-2, and 100-3. Adjacent ones of the hook member portions 100-1-3 are spaced apart by gaps 100-4 and 100-5 to be bifurcated thereby. Hook member 100 is thereby of a comb-like appearance. Hook member 100 alternately may be formed of a single, elongated hook member portion; such bifurcated construction is desirable, however, when hook member 100, surface 106, and sidewall 112 are formed of a thermoplastic material formed during a molding process. Such bifurcated construction prevents scaling of thermoplastic material of dissimilar depths, and is advantageously utilized when smoothness in appearance of the rear surface (not shown in the Figure) of sidewall 112 is of importance.

Each hook member portion 100-1-3 includes an upwardly-extending, ramped, face surface, here designated by reference numerals 118-1, 118-2, and 118-3, respectively. Face surfaces 118-1-3 are coplanar in nature, and each face surface 118-1-3 extends to a back-angled, force-receiving surface, here designated by reference numerals 124-1, 124-2, and 124-3. Force receiving surfaces 124-1-3 also form a coplanar surface.

Figure 2:
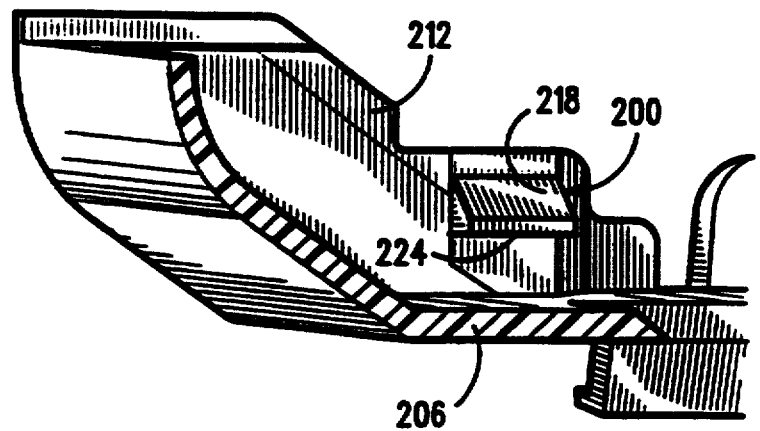
FIG. 2 is a cut away, isometric view similar to that of FIG. 1, but illustrating another hook member forming another portion of the fastener of the preferred embodiment of the present invention.

Turning next to the cut away, isometric view of FIG. 2, a second hook member, referred to generally by reference numeral 200, which forms another portion of the fastener of the preferred embodiment of the present invention, is shown.

Hook member 200 is formed at a predetermined distance above surface 206, here a bottom, face surface of a rear housing portion of a housing assembly. As illustrated, hook member 200 is formed to extend beyond an inner wall of a flange forming sidewall 212 of the rear housing assembly portion. Hook member 200, surface 206 and sidewall 212 of the rear housing assembly portion are preferably integrally formed of a thermoplastic material during a molding process. In contrast to hook member 100 of FIG. 1, hook member 200 is not bifurcated in construction; however, hook member 200 may alternately be constructed to be in such bifurcated form. Analogous to portions 118-1-3 of hook member 100 of FIG. 1, hook member 200 comprises ramped-face surface 218 which, here, however, is downwardly-extending. Face surface 218 extends to back-angled, force-receiving surface 224.

Figure 3:
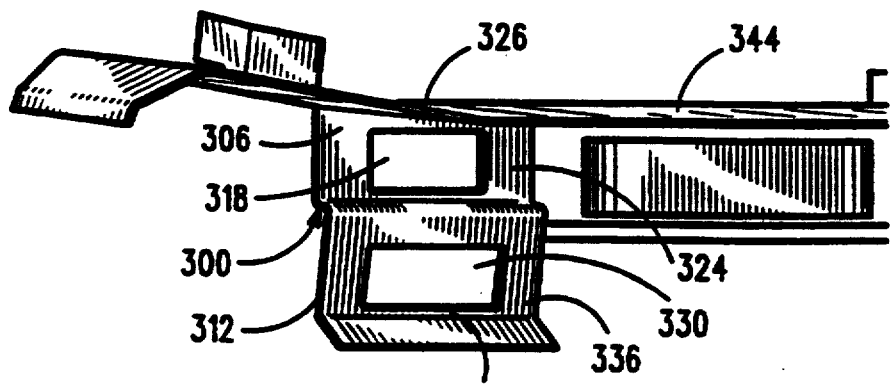
FIG. 3 is a cut away, isometric view of a clip affixed to a substrate which forms another portion of the fastener of the preferred embodiment of the present invention.

FIG. 3 is a cut away, isometric view of a clip, here designated generally by reference numeral 300, which forms another portion of the fastener of the preferred embodiment of the present invention. As illustrated, clip 300 is a multi-slotted plate member, here having a top-slotted portion 306 and bottom-slotted portion 312. Slotted opening 318 extends between front and rear face surfaces (rear face surface 324 is illustrated in the Figure) of top slotted portion 306. Slotted opening 330 extends between front and rear face surfaces (rear face surface 336 is illustrated in the Figure) of bottom slotted portion 312.

Inner edge surface 326 of top slotted portion 306 defines one of the perimetal sides of slotted opening 318. Analogously, inner edge surface 338 of bottom slotted portion 312 defines one of the perimetal sides of slotted opening 330.

Clip 300 is affixed to substrate 344 to extend in a direction substantially perpendicular to a planar direction defined by a surface of the substrate. In the preferred embodiment, and as will be noted more fully hereinbelow, substrate 344 comprises a portion of a card reader assembly and is comprised of a metallic material. Clip 300, in the preferred embodiment is formed integral with substrate 344, and is also comprised of a metallic material. Clip 300 is permitted elastic deformation to allow flexing movement of portions of the clip. While in the preferred embodiment, top slotted portion 306 and bottom slotted portion 312 extend in parallel, but dissimilar planar directions, top and bottom slotted portions 306 and 312, respectively, may alternately be formed to extend in coplanar directions.

Figure 4:
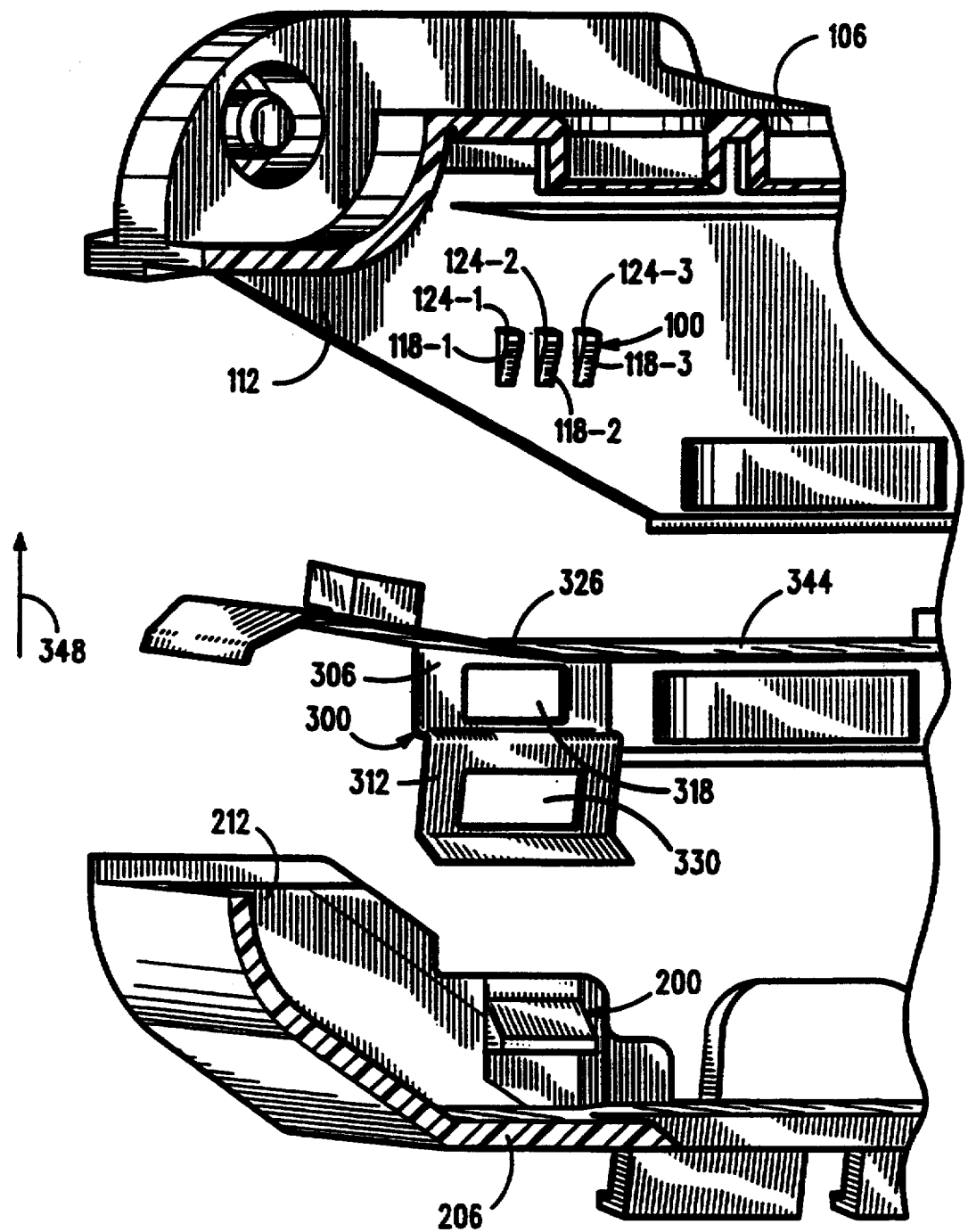
FIG. 4 is a cut away, isometric view of the clip of FIG. 3, here positioned between front and rear housing portions of a housing assembly wherein the hook members of FIGS. 1 and 2 are formed on sidewalls of the front and rear housing portions, respectively.

FIG. 4 is a cut away, isometric view of clip 300 affixed to substrate 344 of FIG. 3 in which substrate 344 and the clip affixed thereto are together positioned between top, face surface 106 of the front housing assembly portion shown in FIG. I and bottom, face surface 206 of the rear housing assembly portion shown in FIG. 2. Hook member 100 is again shown to be formed to extend beyond an inner wall of the flange forming sidewall 112. And, hook member 200 is again shown to be formed to extend beyond an inner wall of a flange forming sidewall 212 of the rear housing assembly portion.

When top and bottom face surfaces 106 and 206, respectively, are tandemly-positioned, as shown, to permit interfitting engagement therebetween, hook members 100 and 200 are aligned with one another in a vertical arrangement. Linear translation of substrate 344 positions clip 300 affixed thereto to be also in an aligned relation with both hook member 100 and hook member 200.

It is noted that the dimensions of slotted opening 318 substantially correspond to the perimetal dimensions of hook member 100, and that the dimensions of slotted opening 330 substantially correspond to the perimetal dimensions of hook member 200.

It is to be understood, of course, that hook members 100 and 200 need not be aligned with one another. Rather, hook members 100 and 200 must be aligned with the slotted openings formed to extend through respective ones of top and bottom slotted portions 306 and 312 of clip 300. FIG. 4-I illustrates an alternate embodiment of the present invention in which hook members 100 and 200 are offset from one another. Clip 300 is comprised of top and bottom slotted portions which are correspondingly offset from one another to permit alignment with respective ones of the hook members. The other structure shown in FIG. 4-I is identical with similarly-numbered structure described with respect to FIG. 4, and will not again be described in detail.

In a first application of the present invention, the fastener of the preferred embodiment is operative to fasten the front and rear housing assembly portions theretogether. In such an application, substrate 344 is operative to position clip 300 in an aligned arrangement between hook members 100 and 200. In such an application, clip 300 could, of course, be alternately positioned in such an aligned relationship by other appropriate means.

In a further application of the present invention, the fastener of the preferred embodiment is operative not only to fasten the front and rear housing assembly portions of the housing assembly theretogether, but, additionally, to fasten a substrate, here a plate member of a card reader assembly, in position within the housing assembly formed thereby. Preferably, although not by necessity, clip 300 is first fastened to hook member 100, and, then, clip 300 is fastened to hook member 200 to fasten thereby surfaces 106 and 206 of the front and rear housing assembly portions, respectively, theretogether.

Accordingly, once clip 300 is aligned between hook members 100 and 200, clip 300 is translated vertically in the direction indicated by arrow 348 such that a front, face surface of top slotted portion 306 of clip 300 abuts against, and engages with, ramped-face surface portions 118-1-3 of hook member portions 100-1-3. Such abutting engagement between the face surfaces 124-1-3 of hook member 100 and the front, face surface of top slotted portion 306 of clip 300 causes bending forces to be exerted against clip 300. Exertion of such bending forces causes elastic deformation of the top slotted portion 306, resulting in flexing movement of the top slotted portion. It is also noted that, when the housing is comprised of a thermoplastic material, the housing also bends responsive to translation of clip 300 thereupon.

Continued translation of clip 300 results in alignment of slotted opening 318 with ramped-face surface portion 118-1-3. Once aligned, the face surfaces 118-1-3 of hook member 100 no longer abut against a face surface of top slotted portion 306; rather, hook member 100 is positioned to extend through slotted opening 318. As bending forces are no longer exerted against top slotted portion 306, top slotted portion 306 returns to an elastically undeformed state, and dip 300 snaps into position about hook member 100 such that inner edge surface 326 seats against back-angled, force-receiving surface portions 124-1-3 of the hook member.

Figure 5:
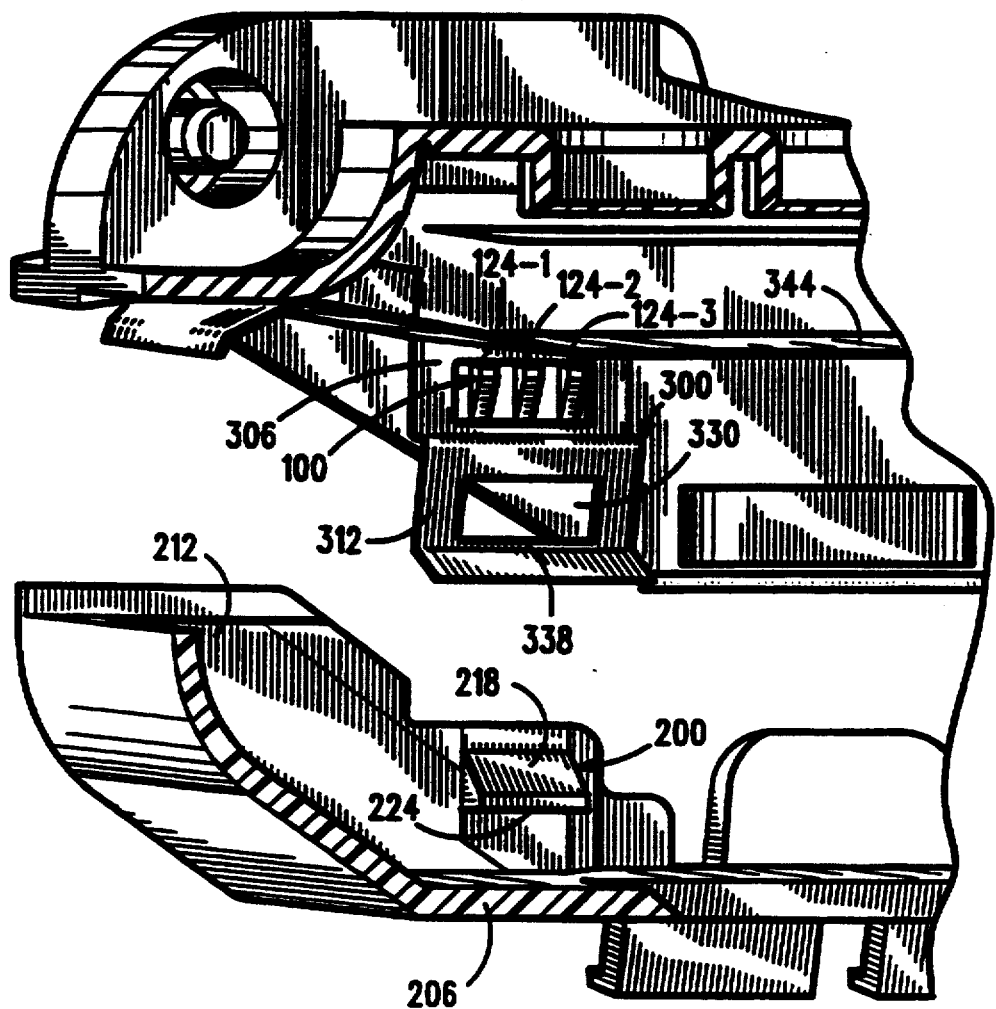
FIG. 5 is a cut away, isometric view, similar to that of FIG. 4, but illustrating the clip after attachment to the hook member formed on the sidewall of the front housing portion.

The cut away, isometric view of FIG. 5 illustrates positioning of clip 300 after the just-described translation of the clip to position to-slotted portion 306 of the clip about hook member 100 to seat the inner edge surface 326 of top slotted portion 306 upon force-receiving surface portions 124-1-3 of the hook member. When positioned as such, substrate 344 is affixed in a desired relation relative to top, face surface 106 of the front housing assembly portion of the housing assembly.

Once clip 300 has been suitably affixed to hook member 100 to seat against force-receiving surfaces 124-1-3 thereof, clip 300 together with surface 106 may be lowered into position to engage claspingly with hook member 200. (Alternately, surface 206 of the rear housing assembly portion may be translated to engage claspingly with clip 300.)

Sliding translation of bottom slotted portion 312 along the downwardly-extending, ramped-face surface 218 of hook member 200 (in a manner analogous to the sliding translation of a face surface of top slotted portion 306 of clip 300 to cause flexing movement of the top slotted portion) causes bending forces to be exerted upon bottom slotted portion 312 to cause elastic deformation, and flexing movement, of bottom slotted portion 312.

Continued translation of bottom slotted portion 312 of clip 300 results in alignment of slotted opening 330 with ramped-face surface portion 218. Once aligned, face surface portion 218 of hook member 200 no longer abuts against a face surface of bottom-slotted portion 312; rather, hook member 200 is positioned to extend through slotted opening 330. As bending forces are no longer exerted against bottom slotted portion 312, bottom-slotted portion 312 returns to an elastically unde-formed state, and clip 300 snaps into position about hook member 200 such that inner edge surface 338 seats against back-angled, force-receiving surface 224.

Figure 6:
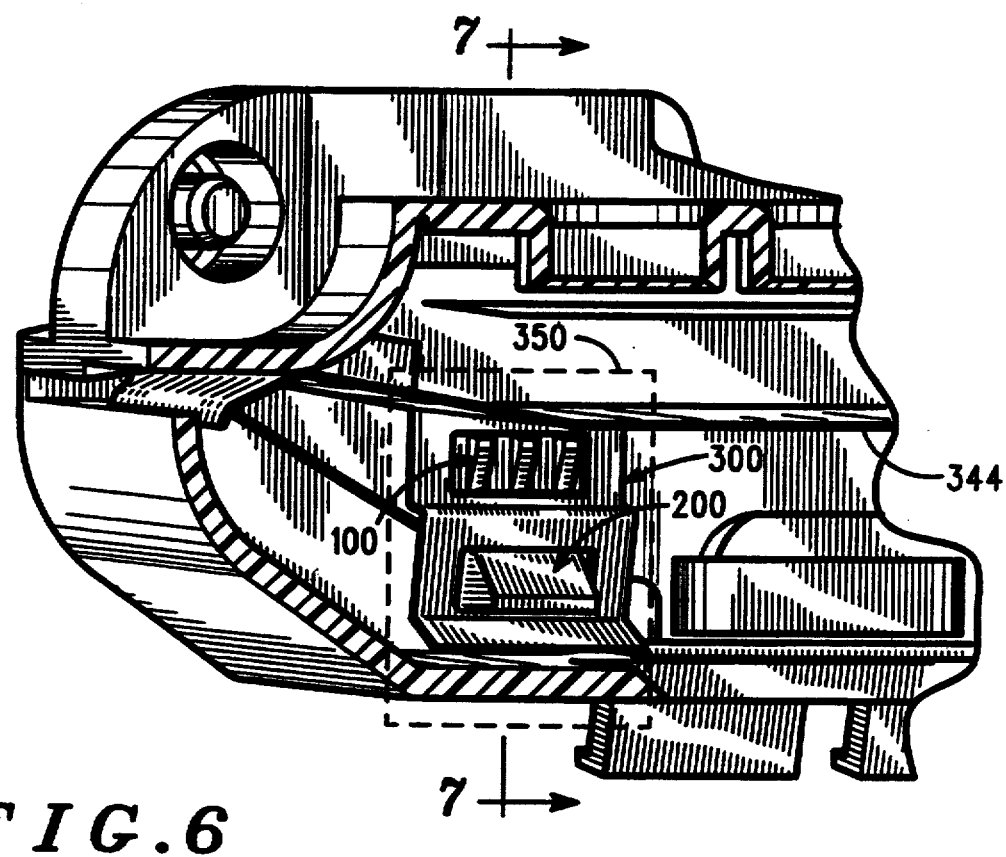
FIG. 6 is a cut away, isometric view, similar to those of FIGS. 4-5, but illustrating the relationship between the hook members and the clip after attachment to both the hook member formed on the sidewall of the front housing portion and the hook member formed on the sidewall of the rear housing portion of the housing assembly to fasten thereby the front and rear housing portions thereat, and to fasten the substrate in position within the housing assembly formed thereby.

The cut away, isometric view of FIG. 6 illustrates the relationship between clip 300 and hook members 100 and 200 once clip 300 is positioned about both hook members. Block 350, shown in hatch, surrounding hook member 100, book member 200, and clip 300 represent the fastener formed of the hook members 100 and 200 and clip 300.

As noted above, in a first application of fastener 350 of the preferred embodiment of the present invention, the fastener is utilized to fasten two tandemly-positioned surfaces, here surfaces 106 and 206 of front and rear housing assembly portion of a housing assembly, theretogether. In a further application of fastener 350, the fastener is additionally operative to position a substrate, here substrate 344, which forms a portion of a card reader assembly fastened in position between top and bottom face surfaces 106 and 206.

Because no channel is required to be formed in sidewalls 212 or 312 in order to fasten hook members 100 and 200 in clasping engagement, the depths of the flanges forming sidewalls 212 and 312 may be of minimal dimensions. Additionally, a single clip, when affixed to a substrate as shown in the preceding figures is utilized, the single clip may be utilized to maintain the three surfaces (i.e., surfaces 106 and 206, and substrate 344) in a desired arrangement therebetween.

Figure 7:
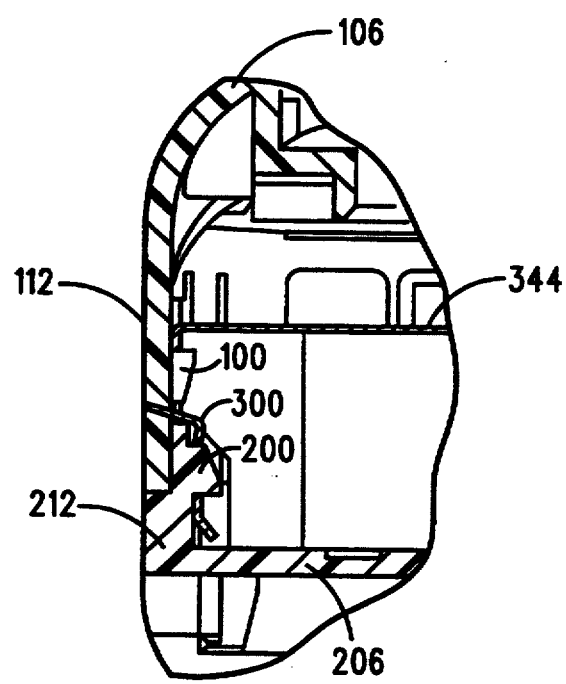
FIG. 7 is cross-sectional view of FIG. 6.

FIG. 7 is a cross-sectional view taken along lines 7—7 of FIG. 6. The relationship between hook members 100 and 200 and clip 300 which together form fastener 350 is again illustrated. Again, hook member 100 is shown to be formed to extend within an inner wall of sidewall 112 formed of a flange extending beneath top surface 106 of a front housing assembly portion. And, hook member 200 is shown to be formed to extend within an inner wall of sidewall 212 formed of a flange portion extending above bottom surface 206 of a rear housing assembly portion. Sidewalls 112 and 212 abut against each other in interfitting engagement therebetween. Clip 300 is formed of a multi-slotted plate member extending beneath substrate 344 at an edge portion thereof in a plane substantially perpendicular to the planar surface defined by substrate 344.

A slotted opening formed to extend through a top slotted portion of clip 300 permits hook member 100 to extend therethrough. Analogously, a slotted opening formed to extend through a bottom slotted portion of clip 300 permits hook member 200 to extend therethrough. Thereby, top and bottom face surfaces 106 and 206 are fastened theretogether by way of clasping engagement of dip 300 to hook members 100 and 200. No channels are required to be formed along sidewalls 112 or 212 thereby permitting minimization of the depth dimensions of such sidewalls.

Figure 8:
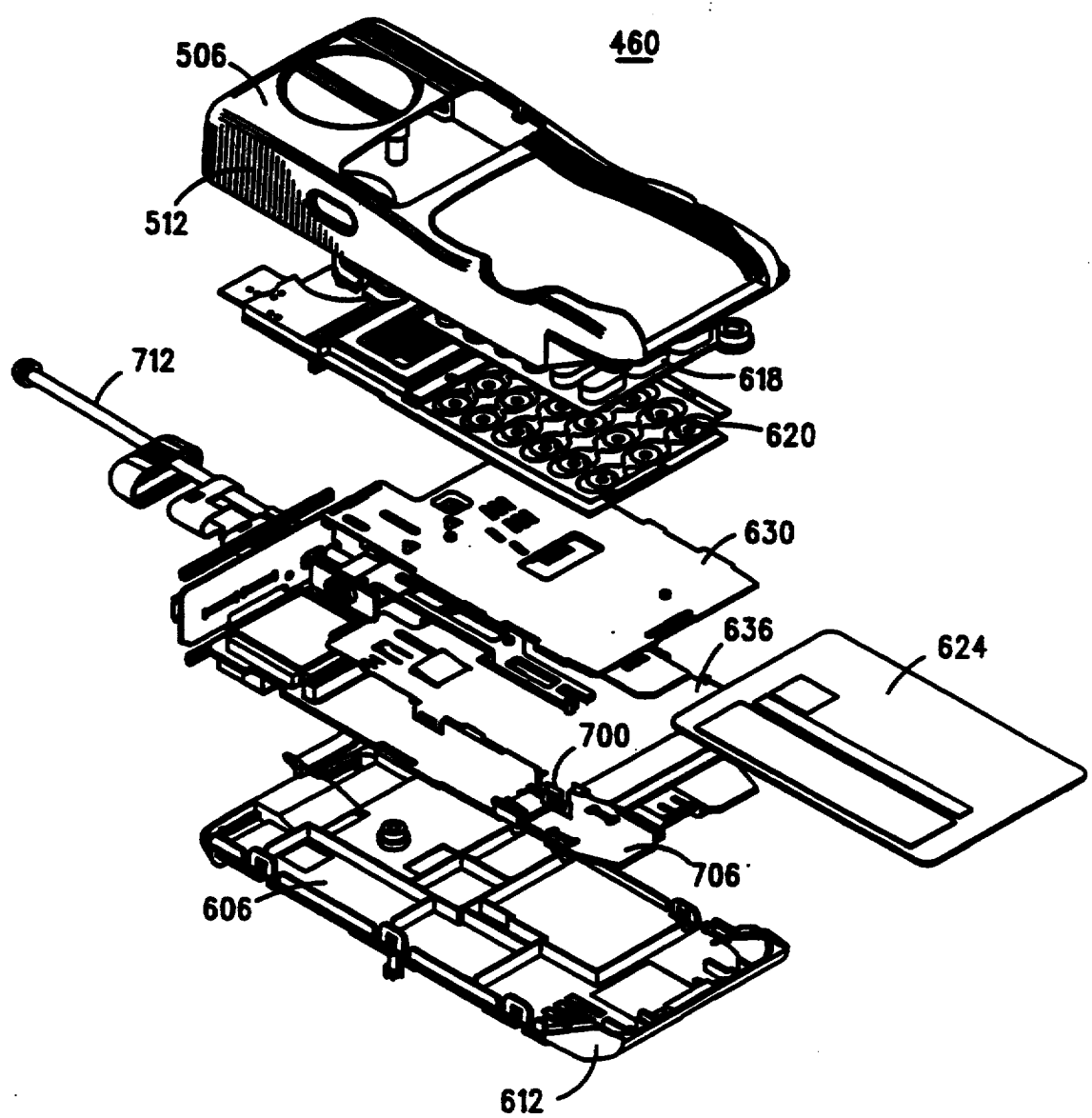
FIG. 8 is an exploded view of a radiotelephone of the preferred embodiment of the present invention which includes the fastener shown in the preceding figures.

Turning next to FIG. 8, a radio transceiver, here a portable, cellular radiotelephone, referred to generally by reference numeral 460, is shown in exploded form. Radiotelephone 460 includes a supportive housing assembly for supporting various components of the radiotelephone therewithin. Top housing assembly portion 506 of the housing assembly includes flange portions extending about perimetal portions thereof which form sidewalls including sidewall 512. Sidewall 512 corresponds with sidewall 112 of the preceding figures, and includes a hook member (not shown in the Figure) formed on an inner wall thereof.

Rear housing assembly portion 606 also forms a portion of the housing assembly and includes flange portions formed about perimetal portions thereof which form sidewalls, including sidewall 612. Sidewall 612 corresponds with sidewall 212 of the preceding figures, and includes a hook member (not shown in the Figure) formed to extend beyond an inner wall thereof.

Positioned directly beneath front housing assembly portion 506 is key pad 618, and directly therebeneath is key pad circuit board 620. Component portions of a card reader assembly for receiving card 624 are positioned beneath key pad circuit board 618.

The card reader assembly is shown to be comprised of slider plate 630 and cover plate 636. Formed integral with, and extending in a plane substantially perpendicular to, the planar surface defined by cover plate 636 is clip member 700. Clip 700 corresponds to clip 300 shown in the preceding figures and is operative to claspingly engage with hook members formed to extend beyond the inner walls of sidewalls 512 and 612. Circuit board 706 is positioned beneath cover plate 636 of the card reader assembly. Antenna 712 is further shown to extend beyond circuit board 706.

When properly aligned, the component portions of radiotelephone 460 are positioned upon one another, and housed within front and rear housing assembly portions 506 and 606 which are, in turn, tandemly-positioned and fastened theretogether by the fastener of the present invention by way of clasping engagement with clip 700.

Figure 9:
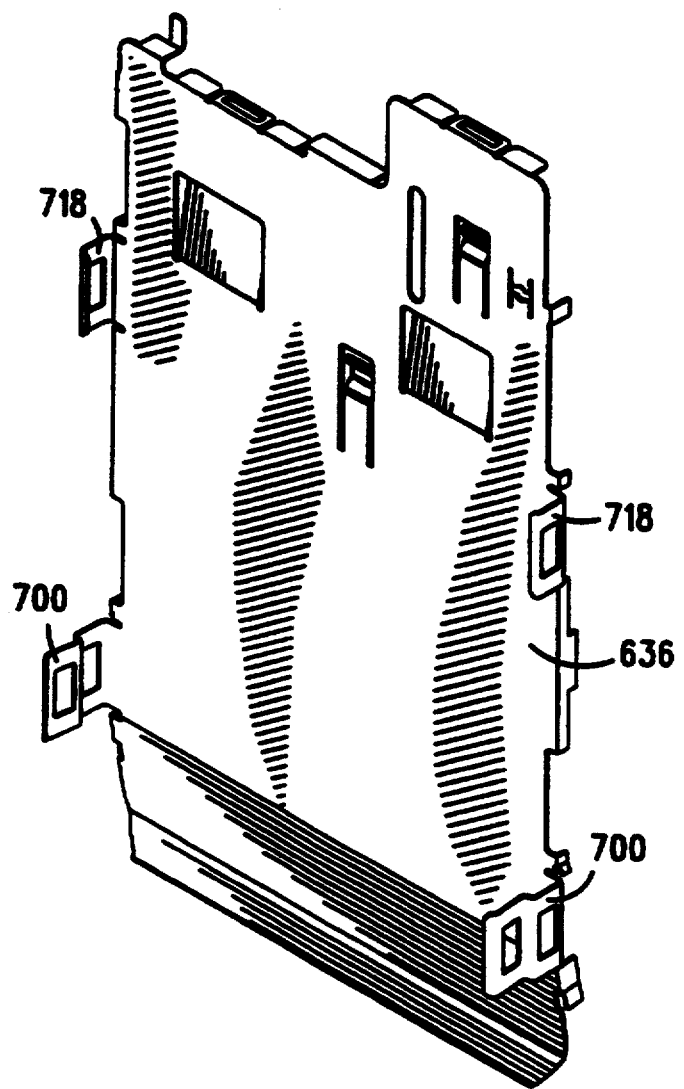
FIG. 9 is an isometric view of a portion of the card reader assembly, shown in the exploded view of FIG. 8, which forms the substrate to which the clip of FIG. 3 is affixed in the preferred embodiment of the present invention.

FIG. 9 is an isolational view of cover plate 636 which comprises a portion of the card reader assembly which is housed within radiotelephone 460 of FIG. 8. Cover plate 636 is shown to include two clips 700 disposed to extend beyond opposite edge portions of the cover plate. Clips 718 are further illustrated in the Figure to extend beyond opposing edge surfaces of the cover plate 636. Clips 718 are comprised of a single slotted portion, analogous to top slotted portion 306 of the preceding figures, and is operative to a fixed cover plate 636 to a single hook member disposed upon a single one of the housing assembly portions, here front housing assembly portion 506.

Figure 10:
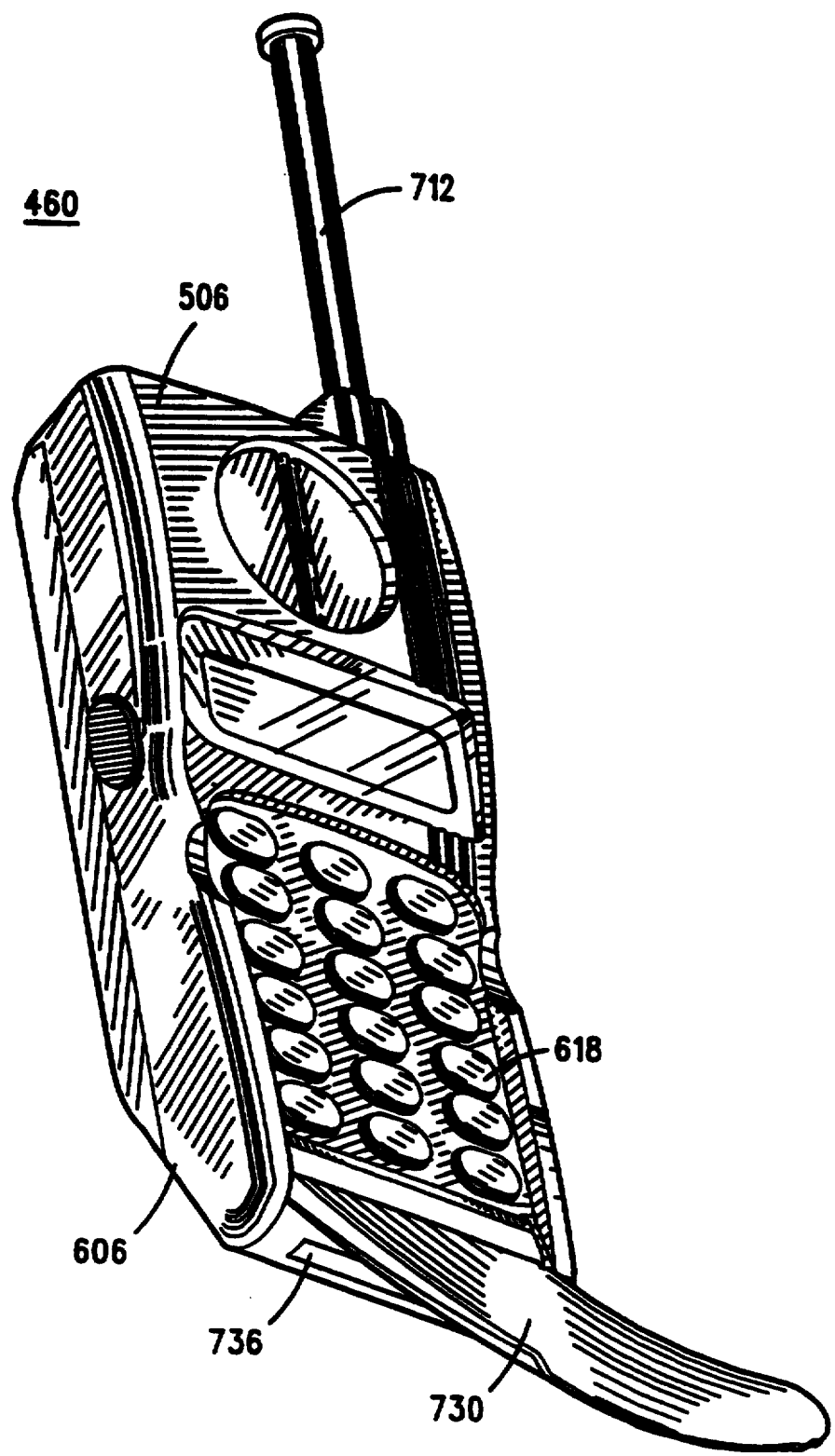
FIG. 10 is an isometric view of the radiotelephone shown in exploded form in FIG. 8.

FIG. 10 is an isometric view of radiotelephone 460 of FIG. 8. Radiotelephone 460 includes front and rear housing assembly portions 506 and 606, key pad 618, and antenna 712. A housing assembly extension 730, pivotally coupled to the front housing assembly portion 506 commonly referred to as a "flip" portion of the radiotelephone is further illustrated in the Figure, as is aperture 736 formed at the interface between sidewalls of the housing assembly. Aperture 736 permits a card to be inserted therewithin to be received by the card reader assembly shown in the previous Figure.

While the present invention has been described in connection with the preferred embodiment shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A fastener for fastening a front housing portion and a rear housing portion of a housing assembly theretogether, thereby to support a substrate in supportive engagement within the housing assembly, said fastener comprising:

means forming a first hook member affixed to an inner sidewall of the front housing portion;

means forming a second hook member affixed to an inner sidewall of the rear housing portion; and means forming a flexible clip affixed to the substrate at a side portion thereof, said clip formed of a first clip portion positioned to extend beneath the substrate and permitting clasping engagement with the first hook member, thereby to fasten the substrate to the front housing portion, and of a second clip portion positioned to extend beneath the first clip portion and permitting of clasping engagement with the second hook member, thereby to fasten the substrate to the rear housing portion and also thereby to fasten the front and rear housing portions theretogether.

2. The fastener of claim 1 wherein the first hook member further comprises an upwardly-extending, ramped-face surface leading to a back-angled, force-receiving surface.

3. The fastener of claim 2 wherein the second hook member further comprises a downwardly-extending, ramped-face surface leading to a back-angled, force-receiving surface.

4. The fastener of claim 3 wherein the means forming the clip comprises a multi-slotted plate member having a top slotted portion comprising the first clip portion, and a bottom slotted portion comprising the second clip portion, the top and bottom slotted portions, respectively, each defining slotted openings of dimensions for receiving the first hook member and the second hook member, respectively, therein.

5. The fastener of claim 4 wherein the top slotted portion comprising a material having flexing movement responsive to bending forces exerted thereupon during sliding translation of the top slotted portion upon the ramped-face surface of the first hook member to position the top slotted portion about the first hook member whereat the first hook member extends through the slotted opening thereof, and an inner edge surface of the top slotted portion seats against the back-angled, force-receiving surface of the first hook member.

6. The fastener of claim 5 wherein the bottom slotted portion is comprised of a material having flexing movement responsive to bending forces exerted thereupon during sliding translation of the bottom slotted portion upon the ramped-face surface of the second hook member to position the bottom slotted portion about the second hook member whereat the second hook member extends through the slotted opening thereof, and an inner edge surface of the bottom slotted portion seats against the back-angled, force-receiving surface of the second hook member.

7. A fastener for fastening a substrate within a housing assembly comprised of a front housing portion and a rear housing portion positioned in tandem therewith, said fastener comprising:

means forming a first hook member positioned beneath a surface of the front housing portion, said first hook member further comprising an upwardly-extending, ramped-face surface leading to a back-angled, force-receiving surface;

means forming a second hook member positioned above a surface of the rear housing portion, Said second hook member further comprising a downwardly-extending, ramped-face surface leading to a back-angled, force-receiving surface; and means forming a flexible clip affixed to the substrate at a side portion thereof, said clip formed of a first clip portion positioned to extend beneath the substrate and permitting clasping engagement with the first hook member, thereby to fasten the substrate to the front housing portion, and of a second clip portion positioned to extend beneath the first clip portion and permitting of clasping engagement with the second hook member, thereby to fasten the substrate to the rear housing portion and also thereby to fasten the front and rear housing portions theretogether.

8. The fastener of claim 7 wherein the means affixed to the substrate is comprised of a multi-slotted plate member affixed to the substrate to extend in a direction substantially perpendicular to a planar surface of the substrate.

9. The fastener of claim 8 wherein the multi-slotted plate member comprises a top slotted portion and a bottom slotted portion, said top and bottom slotted portions define the first and second clip portions respectively, the top and bottom slotted portions, respectively, each defining slotted openings extending between front and rear face surfaces of the top and bottom slotted portions, respectively.

10. The fastener of claim 9 wherein the slotted opening extending between the front and rear face surfaces of the top slotted portion is of dimensions substantially corresponding to dimensions of the first hook member positioned beneath the surface of the front housing portion.

11. The fastener of claim 10 Wherein the top slotted portion is comprised of a material having flexing movement responsive to bending forces exerted thereupon during sliding translation of the top slotted portion upon the ramped-face surface of the first hook member to position the top slotted portion about the first hook member whereat the first hook member extends through the slotted opening thereof, and an inner edge surface of the top slotted portion seats against the back-angled, force-receiving surface of the first hook member.

12. The fastener of claim 9 wherein the slotted opening extending between the front and rear face surfaces of the bottom slotted portion is of dimensions substantially corresponding to dimensions of the second hook member positioned above the surface of the rear housing portion.

13. The fastener of claim 12 wherein the bottom slotted portion is comprised of a material having flexing movement responsive to bending forces exerted thereupon during sliding translation of the bottom slotted portion upon the ramped-face surface of the second hook member to position the bottom slotted portion about the second hook member whereat the second hook member extends through the slotted opening thereof, and an inner edge surface of the bottom slotted portion seats against the back-angled, force-receiving surface of the second hook member.

14. The fastener of claim 7 wherein said first hook member is formed integral with the front housing portion.

15. The fastener of claim 7 wherein the second hook member is formed integral with the rear housing portion.

16. The fastener of claim 7 wherein said means forming the clip is formed integral with the substrate.

17. A fastener for a housing assembly comprised of a front housing portion and a rear housing portion, thereby to support a substrate in supportive engagement within the housing assembly, the front housing portion having a front housing flange and the rear housing portion having a rear housing flange, the front housing portion and the rear housing portion interfittingly engage when the front housing portion and the rear housing portion are positioned in tandem, said fastener comprising:

a first hook member formed on an inner flange wall of the front housing flange, said first hook member having a ramped-face surface leading to a back-angled, force-receiving surface;

a second hook member formed on an inner flange wall of the rear housing flange, said second hook member having a ramped-face surface leading to a back-angled, force-receiving surface; and a clip formed of a multi-slotted plate member affixed to an edge portion of the substrate to extend in a direction substantially perpendicular to a planar surface of the substrate, said multi-slotted plate member having a top slotted portion and a bottom slotted portion positioned therebeneath, the top slotted portion being flexible so as to move in response to bending forces exerted thereupon during sliding translation of the top slotted portion upon the ramped-face surface of the first hook member to position the top slotted portion about the first hook member whereat an inner edge surface of the top slotted portion seats against the back-angled force-receiving surface of the first hook member, thereby to fasten the substrate to the front housing portion, and the bottom slotted portion being flexible so as to move in response to bending forces exerted thereupon during sliding translation of the bottom slotted portion about the ramped-face surface of the second hook member whereat an inner edge surface of the bottom slotted portion seats against the back-angled force-receiving surface of the second hook member, thereby to fasten the substrate to the rear housing portion and also thereby to fasten the front housing portion and the rear housing portion theretogether.

18. In a transceiver having transceiver circuitry and a card-receiving assembly, the transceiver circuitry and the card reader assembly housed within a housing assembly formed of a front housing portion and a rear housing portion positioned in tandem therewith, a combination with the card-receiving assembly and the housing assembly of a fastener for fastening the card-receiving assembly, the front housing portion, and the rear housing portion theretogether, said fastener comprising:

means forming a first hook member positioned beneath a surface of the front housing portion, said first hook member further comprising an upwardly-extending, ramped-face surface leading to a back-angled, force-receiving surface;

means forming a second hook member positioned above a surface of the rear housing portion, said second hook member further comprising a downwardly-extending, ramped-face surface leading to a back-angled, force-receiving surface; and a flexible clip affixed to the card-receiving assembly at a side portion thereof, said clip formed of a first clip portion positioned to extend below the card-receiving assembly and permitting clasping engagement with the first hook member, thereby to fasten the card-receiving assembly to the front housing portion, and of a second clip portion positioned to extend beneath the first clip portion and permitting of clasping engagement with the second hook member, thereby to fasten the card-receiving assembly to the rear housing portion and also thereby to fasten the front and rear housing portions theretogether.

* * * * *